United States Patent [19]
Miyamoto et al.

[11] Patent Number: 5,656,701
[45] Date of Patent: Aug. 12, 1997

[54] POLYURETHANE RESINS, PROCESS FOR PRODUCING THE SAME, AND USES THEREOF

[75] Inventors: Takahito Miyamoto; Kyoichi Kotani, both of Osaka, Japan

[73] Assignee: Sakata Inx Corp., Osaka, Japan

[21] Appl. No.: 148,359

[22] Filed: Nov. 8, 1993

[30] Foreign Application Priority Data

Nov. 6, 1992 [JP] Japan .................................. 4-297328
Oct. 25, 1993 [JP] Japan .................................. 5-266486

[51] Int. Cl.$^6$ .................................................. C08F 283/04
[52] U.S. Cl. ..................... 525/453; 525/454; 525/528; 523/69; 523/85; 524/591; 156/277; 156/314; 156/327; 156/331.7
[58] Field of Search .......................... 525/453, 454, 525/528; 528/69, 85; 524/591; 156/277, 314, 327, 331.7

[56] References Cited

U.S. PATENT DOCUMENTS

| | | | |
|---|---|---|---|
| 3,640,937 | 2/1972 | Oertel et al. | 260/308 |
| 3,687,952 | 8/1972 | Ismail | 260/248 |
| 4,153,775 | 5/1979 | Winkelmann et al. | 528/45 |
| 4,412,022 | 10/1983 | Hirai et al. | 527/107 |
| 4,440,901 | 4/1984 | Reiff et al. | 524/591 |
| 4,598,121 | 7/1986 | Disteldorf et al. | 524/874 |
| 4,623,416 | 11/1986 | Henning et al. | 156/331.7 |
| 4,870,129 | 9/1989 | Henning et al. | 524/830 |
| 5,137,967 | 8/1992 | Brown | 524/840 |

FOREIGN PATENT DOCUMENTS

| | | |
|---|---|---|
| 0099519 | 2/1984 | European Pat. Off. . |
| 0148392 | 7/1985 | European Pat. Off. . |
| 0259679 | 3/1988 | European Pat. Off. . |
| 2010399 | 2/1970 | France . |
| 2707659 | 8/1978 | Germany . |
| 2098621 | 11/1982 | United Kingdom . |

*Primary Examiner*—Paul J. Thibodeau
*Assistant Examiner*—Mary Critharis
*Attorney, Agent, or Firm*—Sughrue, Mion, Zinn, Macpeak & Seas

[57] ABSTRACT

The improved polyurethane resin has a number average molecular weight of 2,000–200,000 and is prepared by reacting an organic diisocyanate compound, a polymer diol compound, a chain extender and a terminator. It is characterized by having at least one group selected from hydrazine groups, hydrazide groups and semicarbazide groups in the molecule. The polyurethane resin can be produced using a chain extender and/or a terminator that have at least one hydrazine group or hydrazide group. This polyurethane resin can be dispersed in water in the presence of an emulsifier or by first introducing free carboxyl groups into the molecule of the resin and then dissolving or dispersing it in an aqueous alkali solution or by first introducing tertiary amino groups into the molecule of the resin and then dissolving or dispersing it in an aqueous acid solution. The water-based polyurethane resin can be used either as a binder for water-based printing inks or as a water-based laminating adhesive. The water-based printing ink and/or the water-based laminating adhesive of the present invention can be used for laminates producing.

19 Claims, No Drawings

POLYURETHANE RESINS, PROCESS FOR PRODUCING THE SAME, AND USES THEREOF

BACKGROUND OF THE INVENTION

This invention relates to polyurethane resins, a process for producing the same and uses thereof. More particularly, the invention relates to polyurethane resins having at least one group selected from hydrazine groups, hydrazide groups and semicarbazide groups (hereinafter, the group of these functional groups is described as HYD. groups), in the molecule, a process for producing the same, aqueous ink compositions for plastic film using the same as binders, aqueous adhesive agents for film lamination and a method of making laminates using said ink and/or adhesives.

With the increasing use of versatile flexible packagings, there has arisen a need to provide high performance printing inks, various coating agents, and adhesives that are applied for decorative, surface protecting, or other purposes. Consider, for example, the printing inks for use on plastic films, they are required to exhibit much better performance than conventional versions in various aspects such as printability, adhesion to various kinds of films, antiblocking properties, and gloss.

Particularly in the food packaging industry, laminated flexible packagings are currently used since direct contact of the contents with inks must be avoided to ensure utmost hygiene while impressing consumers with the high quality of printing. Lamination is carried out two methods described hereunder: extrusion lamination which comprises printing an ink on various plastic film bases, applying a primer coat on the printed surface as required, and then laminating a molten layer of polyolefin or the like; and adhesive lamination which comprises applying an adhesive to the printed surface, and then laminating a plastic film. Whichever method is adopted, inks to be used on the various kinds of plastic films to be laminated are required to adhere strongly not only to the base film but also to the film to be laminated.

One application of laminated flexible packagings that is growing today involves boiling or retorting in hot water so as to cook or sterilize the contents thereof; in this case, the flexible packagings must withstand boiling or retorting without suffering from delamination.

Since the various aspects of ink performance depend primarily upon the performance of binder resins, solvent-based laminating using polyurethane resins as binders have heretofore been used extensively; those inks exhibit not only strong adhesion to various kinds of films but also good adaptability for laminating.

In contrast with such solvent-based laminating inks, the demand for the use of aqueous printing inks is also increasing today in consideration of various aspects including environmental problems, labor saving, occupational safety and food hygiene. However, aqueous printing inks generally exhibit low adhesion to plastic films and the peel strength of laminates; further, their adaptability for boiling and retorting is unsatisfactory.

Under these circumstances, the assignee previously filed Japanese Patent Application No. 354568/1991, in which they proposed an aqueous laminating printing ink for use as a binder in an aqueous polyurethane resin containing a polycarbonate diol as a diol component and which was improved in adhesion to various plastic films and peel strength of laminates. Flexible packagings produced by using such aqueous laminating inks can be used to make bags for packaging dry foods but it does not have sufficient adaptability for making bags that can withstand boiling or retorting.

The assignee also filed Japanese Patent Application No. 317425/1992, in which they proposed a method for improving the adhesion to various plastic films and the peel strength of laminates by using, as an ink binder resin, an acrylic copolymer that had functional groups capable of reaction with a hydrazine group or a hydrazide group introduced into the molecule, and hydrazine compounds as a crosslinking agent, said agent with those functional groups and carbonyl groups that developed on the film surface by subsequent surface treatment. However, compared to inks using polyurethane-base binder resins that can be used and, hence, the printing inks used in this method are poor in pigment dispersability and printability; furthermore, during storage, the binder resins will crosslink with the crosslinking agents to lower their fluidity and capability for redissolution. As another problem, there is no guarantee for the occurrence of positive crosslinking said agents with the binder resins and the film surface, and this has often caused nonuniformity in adhesion and the peel strength of laminates.

Thus, no aqueous printing inks have yet been commercialized that are satisfactory not only in adhesion to various kind of plastic films but also in the peel strength of laminates, as well as in adapatability for boiling and retorting.

The advent of aqueous primer coat or adhesives is desired to insure that laminated flexible packagings are totally consisted of water, thereby achieving occupational safety and food hygiene; however, no acceptable products have yet been commercialized.

SUMMARY OF THE INVENTION

A first object, therefore, of the prevent invention is to provide a polyurethane resin having at least one of HYD. groups in the molecule.

A second object of the present invention is to provide an aqueous polyurethane resin that has said polyurethane resin dispersed in water in the presence of an emulsifier or that has free carboxyl groups or tertiary amino groups introduced into the molecule of said polyurethane resin, followed by dissolution or dispersion in an aqueous alkali or acid solution.

A third object of the present invention is to provide processes for producing those polyurethane resins.

A fourth object of the present invention is to provide an aqueous printing ink and an aqueous laminating adhesive for plastic film that use those aqueous polyurethane resins and, optionally, an epoxy resin.

A fifth object of the present invention is to provide a process for producing a laminated product using said aqueous printing ink and/or said aqueous laminating adhesive.

Stated more specifically, the present invention relates to a polyurethane resin having a number average molecular weight of 2,000–200,000 that is prepared by reacting an organic diisocyanate compound, a polymer diol compound, a chain extender and a terminator, characterized in that a chain extender and/or a terminator that have at least one hydrazine group or hydrazide group is used to incorporate at least one of HYD. groups in the molecule of the polyurethane resin. In a preferred case, said polyurethane resin has a molecular structure that is represented by the following general formula (1);

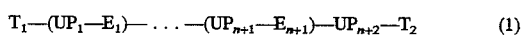

where $UP_1$—$UP_{n+2}$: that part of a urethane prepolymer which excludes a terminated isocyanate group, said prepolymer being prepared by reacting the organic diisocyanate compound with the polymer diol compound, provided that n is an integer of 0–18 and that $UP_1$—$UP_{n+2}$ may have the same or different structures;

$E_1$—$E_{n+1}$: that part of the chain extender which excludes the functional groups having reacted with the isocyanate group, said chain extender having at least two functional groups capable of reaction with the isocyanate group, provided that n is an integer of 0–18 and that $E_1$—$E_{n+1}$ may have the same or different structures;

$T_1$, $T_2$: that part of the terminator which excludes the functional groups having reacted with the isocyanate group, said terminator having at least one functional group capable of reaction with the isocyanate group, provided that $T_1$ and $T_2$ may have the same or different structures; and — : the bond that has been formed by reaction between the isocyanate group and the functional group capable of reaction with said isocyanate group:
provided that at least one of $E_1$—$E_{n+1}$, $T_1$ and $T_2$ has at least one hydrazine group or hydrazide group.

The general formula (1) is a schematic presentation and shows only a straight-chained structure but it should be noted that the general formula (1) may partly contain a branched chain.

The present invention also relates to an aqueous polyurethane resin that is prepared by dissolving or dispersing the above-defined polyurethane resin in water.

The present invention further relates to processes for producing those polyurethane resins, as well as uses thereof.

DETAILED DESCRIPTION OF THE PREFERRED EMBODIMENT

To being with, the organic diisocyanate compound, polymer diol compound, chain extender and terminator that are to be used in the polyurethane resins of the present invention are first described below.

The polyurethane resins of the present invention have at least one of HYD. groups introduced into the molecule using a chain extender and/or a terminator that have at least one hydrazine group or hydrazide group; hence, the following description also covers such chain extender and terminator that have at least one hydrazine group or hydrazide group. Further, when one wants to use the polyurethane resins of the present invention as aqueous printing inks or aqueous laminating adhesives, the resins are dispersed in water in the presence of an emulsifier or, alternatively, the polyurethane resins having free carboxyl groups are dissolved or dispersed in an aqueous alkali solution or, the polyurethane resins having tertiary amino groups are dissolved or dispersed in an aqueous acid solution. Hence, the following description also covers the polymer diol compound and chain extender containing a free carboxyl group or a tertiary amino group for introducing the free carboxyl group or tertiary amino group into the molecule of the polyurethane resins.

First, the organic diisocyanate compound is discussed. Exemplary organic diisocyanate compounds include aliphatic diisocyanate compounds such as hexamethylene diisocyanate and 2,2,4-trimethylhexamethylene diisocyanate, alicyclic diisocyanate compounds such as isophorone diisocyanate, hydrogenated xylylene diisocyanate and 4,4-cyclohexylmethane diisocyanate, aroaliphatic diisocyanate compounds such as xylylene diisocyanate and tetramethylxylylene diisocyanate, and aromatic diisocyanate compounds such as toluylene diisocyanate and diphenylmethane diisocyanate. Among these compounds alicyclic or aroaliphatic diisocyanate compounds are preferred since they provide good adhesion to various kinds of films and insure efficient redissolution of aqueous printing inks.

Exemplary polymer diol compounds include: polyester diols that are prepared by polycondensation of low-molecular weight diols (e.g., straight-chained glycols such as 1,3-propanediol, 1,4-butanediol and 1,6-hexanediol, branched glycols such as 1,2-propanediol, neopentyl glycol, 3-methyl-1,5-pentanediol and ethylbutylpropanediol, and ether-base diols such as diethylene glycol and triethylene glycol) with dibasic acid compounds such as adipic acid and phthalic acid, or by the ring-opening reaction of cyclic ester compounds such as lactones. Other examples include polyether diols that are prepared by homo- or copolymerizing ethylene oxide, propylene oxide, tetrahydrofuran, etc., as well as polycarbonate diols that are prepared by reacting carbonate compounds (e.g., alkylene carbonates, diallyl carbonates and dialkyl carbonates) or phosgene with the above-mentioned low-molecular weight diol components, and polybutadiene glycols, etc, can be used.

Examples of the polymer diol compound having a free carboxyl group include those which are prepared by reacting the above-mentioned polymer diol components with tetrabasic acid dianhydrides such as pyromellitic dianhydride or by the ring-opening polymerization of lactones in the presence of dimethylolpropionic acid or other initiators.

Examples of the polymer diol compound having a tertiary amino group include those which are prepared by the ring-opening polymerization of alkylene oxides, lactones, etc. in the presence of an initiator selected from among amino containing diol compounds such as N-methyldiethanolamine.

The polymer diol compounds that can preferably be used have molecular weights in the range from 500 to 4000.

If one wants to use the polyurethane resins of the present invention as binders in printing inks and the like, from the view of obtaining a resin which has good adhesion to plastic film and high adaptability for making laminates, polyester diols and polycarbonate diols can preferable be used. If adaptability for boiling and retorting is necessary, polyester diols may be used with advantage.

We next discuss the chain extender that is used for extending the chains of the urethane prepolymer.

To being with, the chain extender that has at least one hydrazine group or hydrazide group may be exemplified by polyamino hydrazine compounds that are represented by the following general formula (2):

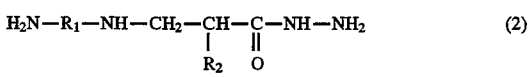

(2)

where $R_1$ is an alkylene group having 2–15 carbon atoms, that portion of an alicyclic or aromatic diamine having 6–15 carbon atoms which excludes the amino group, or that portion of a polyethylene polyamine having 3–5 nitrogen atoms which excludes the primary amino group; and $R_2$ is hydrogen or a methyl group.

The chain extender of the general formula (2) can be prepared in accordance with a known method (as described in Japanese Patent Publication No. 8649/1991) that starts with forming a Michael addition compound between polyamine and a (meth)acrylic acid derivative and which then involves an ester exchange between hydrazine and the (meth)acrylic acid ester portion.

Examples of the polyamine that can be used in the synthesis of polyaminohydrazide include aliphatic diamines having 2–15 carbon atoms such as ethylenediamine, butylenediamine, hexamethylenediamine and trimethylhexamethylenediamine, alicyclic or aromatic diamines having 6–15 carbon atoms such as diaminobenzene, xylylenediamine, 4,4'-diaminobicyclomethane, 1,4-diaminocyclohexane, 1,4-bis(aminomethyl)cyclohexane and isophoronediamine, as well as diethylenetriamine, triethylenetetramine and tetraethylene-pentamine.

Exemplary (meth)acrylic acid derivatives include alkyl esters, hydroxyalkyl esters and aminoalkyl esters of acrylic or methacrylic acid. Among these compounds, acrylic acid derivatives are preferred in view of their high reactivity.

Exemplary chain extenders having a tertiary amino group include N-alkyldialkanolamine compounds such as N-methyldiethanolamine and N-ethyldiethanolamine, and N-alkyldiaminoalkylamine compounds such as N-methyldiaminoethylamine and N-ethyldiaminoethylamine.

A chain extender having a free carboxyl group may be used to produce aqueous polyurethane resins. Examples of such chain extender include compounds represented by the following general formula (3)

(where $R_3$ is a hydrogen atom or a straight-chained or branched alkyl group having 1–8 carbon atoms), aliphatic carboxylic acid containing diols that are formed by reacting succinic anhydride, maleic anhydride, etc. with lower triols, and aromatic carboxylic acid containing diols that are formed by reacting phthalic anhydride, trimellitic anhydride with lower triols, or pyromellitic anhydride with lower diols.

Other useful chain extenders include glycols such as ethylene glycol and propylene glycol, aliphatic diamines such as ethylenediamine, 1,4-butanediamine and aminoethylethanolamine, aliphatic polyols such as glycerin, 1,2,3-trimethylolpropane and pentaerythritol, alicyclic polyols such as 1,3,5-cyclohexanetriol, and aliphatic polyamines such as diethylenetriamine, triethylenetetramine and tetraethylenepentamine.

If compounds having at least three functional groups capable of reaction with the isocyanate group are used as chain extenders, branches may occasionally form in the molecule of polyurethane.

We next discuss the terminator.

After the urethane prepolymer are extended with the chain extender, the reaction is terminated with terminator.

The first example of terminator is one having at least one hydrazine group or hydrazide group, such as the polyaminohydrazide described above, and the other compounds may also be used, as exemplified by hydrazine (generally used as hydrazine hydrate), as well as alkylenedihydrazines or dihydrazide compounds of saturated aliphatic dibasic acids or unsaturated dibasic acids that are represented by the following general formula (4):

(where X is an alkylene group having 1–8 carbon atoms or a saturated or unsaturated dibasic acid residue having 1–10 carbon atoms).

Specific examples of the alkylenedihydrazine include methylenedihydrazine, ethylenedihydrazine, propylenedihydrazine and butylenedihydrazine. Specific examples of the dihydrazide compound of a saturated aliphatic dibasic acid include oxalic acid dihydrazide, malonic acid dihydrazide, succinic acid dihydrazide, glutaric acid dihydrazide, adipic acid dihydrazide and sebacic acid dihydrazide. Specific examples of the dihydrazide compound of an unsaturated dibasic acid include phthalic acid dihydrazide, fumaric acid dihydrazide and itaconic acid dihydrazide.

Other useful terminator include alkylamines such as n-propylamine, n-butylamine and N,N-di-n-butylamine, alkanolamines such as monoethanolamine and diethanolamine, and monoalcohols such as methanol and ethanol. The chain extenders described before may also be used as the terminator.

The above-described organic diisocyanate compound, polymer diol compound, chain extender and the terminator are used to produce the polyurethane resin by the following procedure.

The process starts with reacting the organic diisocyanate compound with the polymer diol compound at a molar ratio (diisocyanate/polymer diol) of (1.3/1.0–3.0/1.0), preferably (1.5/1.0–2.0/1.0) to synthesize a urethane prepolymer. Then, the chain extender is added in an amount 0.5–0.95 times the equivalent amount of the residual isocyanate group, optionally in the presence of a solvent, a catalyst and the like, and reaction is carried out at a temperature of 30°–140° C.; thereafter, the reaction of the residual isocyanate groups is stopped with the terminator to complete the process of production of the polyurethane resin.

The polyurethane resin produced by this method is characterized in that individual molecules are substantially uniform in structure; in addition, the molecular distribution of the polyurethane resin are so narrow that it is preferably used as a binder resin for inks or as an adhesive.

If desired, the same compound may be used as both the chain extender and the terminator so that chain extension and terminating of the reaction are performed simultaneously; alternatively, the chain extender and the terminator which is different from the extender may be added in the same batch.

The polyurethane resin can also be produced by feeding in the same batch the organic diisocyanate compound, polymer diol compound, chain extender, terminator and, optionally, a catalyst and a solvent. However, in this case, it is difficult to control the molecular structures of the polyurethane resin and its molecular weight and that resin can not be ensure the same performance; hence, the use of the product polyurethane resin is limited.

The polyurethane resins that are produced from the materials described above by the method that is also described above have molecular weights of 2,000–200,000, preferably from 10,000 to 100,000. If the molecular weight of the polyurethane resins is less than 2,000, the resin's film lacks elasticity and toughness. If the molecular weight of the polyurethane resins exceeds 200,000, the aqueous polyurethane resins as dissolved in the aqueous alkali or acid solution to be described hereinafter will become highly viscous; in the case of the aqueous polyurethane resins as dispersed in the aqueous alkali or acid solution or in water in the presence of an emulsifier, the dispersion stability will decrease.

In the process of reaction involving the polyurethane resin of the present invention, it cannot be said that the chain extender or terminator that have at least one hydrazine group or hydrazide group are distributed uniformly in all molecules of the polyurethane resin; however, the performance required by the present invention is achieved if the polyurethane resin has at least one of HYD. groups on average per molecule.

We next describe the methods to dissolve or disperse the polyurethane resin of the present invention in water. The first method to be adopted comprises dispersing the polyurethane resin in water in the presence of an emulsifier. This method can be implemented by two approaches; in one approach, the urethane prepolymer prepared by reacting the organic diisocyanate compound with the polymer diol compound is dispersed in water in the presence of an emulsifier and then are extended with the chain extender and the reaction is terminated by means of the terminator. In the other approach, the urethane prepolymer is dissolved in a water-miscible solvent such as acetone or methyl acetate and chains in the prepolymer are extended with the chain extender and the reaction is terminated by means of the terminator; thereafter, the reaction product is mixed with water containing an emulsifier and the solvent is distilled off.

Examples of the emulsifier that can be used in this method include anionic surfactants such as higher alcohol sulfate ester salts, alkylbenzenesulfonate salts and polyoxyethylene alkyl sulfate ester salts, and nonionic surfactants such as polyoxyethylene alkyl ethers, polyoxyethylene alkyl phenylethers and sorbitan derivatives. These emulsifiers can be used either alone or in admixtures.

By this method, the polyurethane resin can be dispersed in water irrespective of whether the molecule of the polyurethane resin contains or does not contain a carboxyl group or a tertiary amino group.

The second method to be adopted for rendering the polyurethane resin to be aqueous comprises dissolving or dispersing said resin in an aqueous alkali solution. To implement this method, the polymer diol compound or chain extender that have a free carboxyl group must be used.

The polyurethane resin must have the acid value more than 5 to be dissolved or dispersed in an aqueous alkali solution. If the acid value of the polyurethane resin is less than 5, it is difficult for the resulting aqueous polyurethane resin to maintain a stable dispersed state by itself in the aqueous system. If the acid value of the polyurethane resin exceeds 100, the formed film will become too hard to provide satisfactory physical properties. Hence, the content of the carboxyl group in the polymer diol compound or chain extender must be properly adjusted in accordance with the specific use of the polyurethane resin and the required performance.

Alkali compounds that are to be used in aqueous solution include ammonia, organic amines and alkali metal hydroxides. Specific examples of organic amines include alkylamines such as diethylamine, triethylamine and ethylenediamine, and alkanolamines such as monoethanolamine, ethylethanolamine and diethylethanolamine. Specific examples of alkali metal hydroxides include sodium hydroxide and potassium hydroxide.

The third method to obtain the aqueous polyurethane resin comprises dissolving or dispersing the resin in an aqueous acid solution. To implement this method, the polymer diol compound and/or chain extender that have a tertiary amino group must be used.

The polyurethane resin must have the amine value more than 10 to be dissolved or dispersed in an aqueous acid solution. If the amine value of the polyurethane resin is less than 10, it is difficult for the resulting aqueous polyurethane resin to maintain a stable dispersed state in the aqueous system. If the amine value of the polyurethane resin exceeds 40, the resin's film that is formed will become too hard to provide satisfactory physical properties. Hence, the content of the tertiary amino group in the polymer diol compound or chain extender must be properly adjusted in accordance with the specific use of the polyurethane resin and the required performance.

Acids that are to be used in aqueous solution include inorganic and organic acids such as hydrochloric acid, nitric acid and acetic acid.

The solids content of the aqueous polyurethane resins described hereinabove is advantageously in the range from 5 to 50 wt %. If the solids content of the aqueous polyurethane resin is less than 5 wt %, the concentration of the resin is so low that its use is limited. If the solids content of the aqueous polyurethane resin exceeds 50 wt %, it is difficult for the resin to be efficiently dissolved or dispersed in water.

The alkali or acid to dissolve or disperse the polyurethane resin in water is used in an amount 0.15–1.2 times the equivalent amount (neutralization rate=100%) which is necessary to neutralize the polyurethane resin. If the use of the alkali or acid is less than 0.15 times the equivalent amount, it becomes difficult for the polyurethane resin to be effectively dispersed in water. If desired, the alkali or acid may be used in excess of 1.2 times the equivalent amount; however, the effectiveness of the alkali or acid to dissolve or disperse the polyurethane resin in water will not differ greatly from the case where they are used in an amount 1.2 times the equivalent amount.

We next describe the uses of the polyurethane resin of the present invention. First, the aqueous polyurethane resin of the present invention can be used as a binder for aqueous printing ink compositions. The aqueous printing ink composition according to the present invention comprises a pigment, an aqueous binder resin, water and a water-miscible solvent as an optional component and this ink composition is intended for use on plastic films.

The pigment may be selected from among inorganic pigments, organic pigments and fillers that are commonly used in printing inks, paints and the like. The pigment is advantageously used in amounts ranging from 5 to 60 wt % of the ink composition.

The aqueous binder resin contains as the essential component the aqueous polyurethane resin which is specified herein; this aqueous polyurethane resin may be dispersed in water in the presence of an emulsifier or it may be dissolved or dispersed in an aqueous alkali or acid solution, and either type or aqueous binder resin may be used in the present invention.

The aqueous printing ink composition of the present invention may contain an epoxy resin as a crosslinking component and this contributes to the manufacture of laminated products that have better adaptability for boiling or retorting.

Examples of the useful epoxy resin include the bisphenol-epichlorohydrin epoxy resin, cycloaliphatic epoxy resins, novolak epoxy resins, epoxy olefinic resins, polyolglycidyl epoxy resins, epoxidized soybean oil and silane epoxy resins.

Among these epoxy resins, those which will not dissolve or disperse in water on their own may be added after being forcibly emulsified in water with the aid of an emulsifier.

From the viewpoint of reactivity with the epoxy resin, it is more preferable to use a polyurethane resin that is specified herein and which also contains in the molecule a carboxyl group that is directly bonded to the aromatic ring.

In the case under consideration, the polyurethane resin which is specified herein and the epoxy resin are mixed typically at a weight ratio of 99:1–50:50 (polyurethane resin: epoxy resin), preferably at a weight ratio in the range from 95:5 to 60:40.

With a view to improving other aspects of the ink performance, various other aqueous resins may be added as exemplified by cellulosic resins, acrylic resins, polyester resins, styrene-maleic acid based resins, ethylene-acrylic acid based resins, and polyurethane resins that do not have HYD. groups in the molecule.

These aqueous binder resins are preferably used in such amounts that the solids content of the resin is in the range from 5 to 30 wt % of the ink composition.

Depending upon the need for other aspects of ink performance, it is possible to incorporate water-miscible solvents such as lower alcohols or alkoxypropanols (e.g., methanol, ethanol, isopropanol and methoxypropanol), as well as various additives including anti-blocking agents, defoamers and crosslinking agents other than epoxy resins.

Using the materials listed above, one can produce a aqueous printing ink composition by a process that comprises first mixing a pigment with the aqueous binder resin under agitation, then blending the ingredients of the mixture in a conventional disperser, further adding predetermined components, and finally mixing all ingredients to homogeneity.

Another use of the aqueous polyurethane resin of the present invention is as an aqueous laminating adhesive. The aqueous polyurethane resin of the present invention can be immediately used as a aqueous laminating adhesive after it is dissolved or dispersed in an aqueous acid or alkali solution. For imparting better adaptability for boiling and retorting, the aqueous polyurethane resin of the present invention may be used in combination with an epoxy resin that is selected from among the epoxy resins that have been listed hereinabove as crosslinking components of the aqueous printing ink composition. From the viewpoint of reactivity with epoxy resins, the polyurethane resin specified herein may preferably be selected from among those which have in the molecule a carboxyl group that is directly bonded to the aromatic ring.

In the case under consideration, the aqueous polyurethane resin specified herein is mixed with the epoxy resin at a weight ratio that typically ranges from 99:1 to 50:50 (polyurethane resin: epoxy resin), preferably from 95:5 to 60:40. If the mixing ratio of the epoxy resin exceeds 50:50, adhesive strength will drop to an undesirably low level.

We next describe the method of lamination using the aqueous ink composition and/or aqueous laminating adhesive according to the present invention. The aqueous ink composition of the present invention can be printed on various kinds of plastic films such as polyolefin, modified polyolefin, polyester, nylon and polystyrene films. It is particularly preferable to print on plastic films that have been subjected to corona discharge treatment or surface coating treatments. The aqueous ink composition of the present invention can be printed by flexographic or gravure printing techniques with known flexographic or gravure presses.

The printed matter thus produced may be worked into laminates by either extrusion laminating or adhesive laminating processes. When applying the extrusion laminating process, the aqueous laminating adhesive of the present invention or any one of the conventionally used primer coat including titanium, isocyanate, imine and polybutadiene base compounds is applied to the surface of the printed matter and a molten polymer is laminated by means of a known extrusion laminating machine; if desired, the molten resin may be overlaid with another material (ex. aluminum foil), thus producing a sandwich structure in which the molten resin forms an intermediate layer.

The resin to be melted in the extrusion laminating process may be selected from among conventionally used resins such as low-density polyethylene, ethylene-vinyl acetate copolymer and polypropylene. Among these resins, the low density polyethylene which is oxidized upon melting to increase the change of the generation of carbonyl groups is preferred since the advantages of the present invention are attained with higher efficiency.

When applying the adhesive laminating process, the aqueous laminating adhesive of the present invention or any one of the conventionally used adhesives including aqueous solvent based and solvent free isocyanate compounds is applied to the surface of the printed matter and a polymer film is bonded by means of a known adhesive laminating machine.

The polymer film to be used in the adhesive laminating process may be selected from the films of polyethylene, polypropylene, etc. Particularly in the case of making laminates that are to be retorted, hot water resistance may be imparted by sandwiching an aluminum foil between the base and the plastic film.

In order to produce laminates using a completely aqueous ink and adhesive so that there will be no problems in safety, hygiene and environmental aspects, the aqueous ink is preferably used in combination with a aqueous or solvent-free adhesive.

The laminates produced by the methods described above have not only high strength but also good adaptability for boiling and retorting. If the aqueous printing ink composition and aqueous laminating adhesive of the present invention are used in combination, laminates can be produced that have the added advantage of assuring safety, hygiene and environment friendliness.

The aqueous polyurethane resin that is specified herein and which has at least one HYD. groups in the molecule exhibit strong adhesion to various kinds of plastic films and it is particularly useful on plastic films that have been subjected to corona discharge and other treatments to have keto groups formed on the surface. This would be explained as follows: only a weak interaction (ex. chemical adsorption) works between the conventional polyurethane resin and the surface of a plastic film; in contrast, a very strong bonding force due to the dehydrative condensation reaction between the HYD. groups and the keto group works between the polyurethane resin of the present invention and the surface of a plastic film.

The polyethylene to be used in the extrusion laminating process is oxidized with oxygen in air to generate keto groups in the molecule while it is thermally melted and laminated on the printed surface; thus, for the same reason as stated above in connection with surface treated polymer films, laminates having very high strength can be produced.

Hence, despite its aqueous nature, the printing ink that uses the polyurethane resin of the present invention exhibits good adhesion to various kinds of plastic films and enables the production of very strong laminates.

The polyurethane resin of the present invention does not have any functional groups in the molecule that will react with HYD. groups and, hence, no crosslinking will occur either intramolecule or intermolecule and this offers the advantage that the ink that uses the polyurethane resin as a binder can be stored for a prolonged time without experiencing any drop in fluidity and capability for redissolution.

If desired, an epoxy resin may be added as a crosslinking agent immediately before printing is done with the aqueous ink composition of the present invention; in this case, a crosslinking reaction occurs between the epoxy and polyurethane resins after printing, whereby a marked improvement is achieved in resistance to both heat and water, thus making it possible to produce laminates having good adaptability for boiling and retorting.

On the pages that follow, the present invention is described in greater detail with reference to working examples but it should be noted that those examples are by no means limiting. In the following synthesis examples, working examples and comparative examples, all "parts" and "percentages" are by weight unless otherwise noted.

Synthesis Example 1

Synthesis of Polyaminohydrazide (Composition of Compound A)

A four-necked flask equipped with a stirrer, a condenser, a $N_2$ gas introducing tube and a dropping funnel were charged with 158.3 parts of trimethylhexamethylenediamine, which was heated at 45° C. while $N_2$ gas was introduced; thereafter, 100 parts of ethyl acrylate that had been heated at 45°–50° C. was added dropwise over 90 min.

The resulting reaction product was warmed at 45° C. for 7 h until the reaction was completed. Then, 50 parts of a hydrazine hydrate that had been heated at 50° C. was added, followed by heating at 65° C. to perform reaction for 5 h until a composition of compound A was yielded.

Synthesis Example 2

Synthesis of Aromatic Carboxylic Acid Containing Diol Compound (Solution of Compound B)

Equipment of the same construction as used in Synthesis Example 1 was charged with 148 parts of phthalic arthydride, 134 parts of trimethylolpropane and 300 parts of dried 2-methylpyrrolidone and the mixture was heated at 80° C. to initiate reaction, which was performed until the anhydride group disappeared, thus yielding a solution of compound B.

Example 1

A four-necked flask equipped with a stirrer, a condenser and a $N_2$ gas introducing tube was charged with 300 parts of polybutylene glycol adipate diol having an average molecular weight of 1000 and 133.2 parts of isophorone diisocyanate, and reaction was performed at 100°–105° C. for 2 h while $N_2$ was introduced. Subsequently, 24.1 parts of dimethylolpropionic acid was added and the reaction was continued at 80°–90° C. for 2 h. After confirming the completion of reaction of dimethylolpropionic acid, 1137 parts of water and 21.2 parts of triethylamine were fed to make an aqueous system; further, 28.1 parts of the composition of compound A was fed to perform chain extension, followed by feeding 3.7 parts of monoethanolamine to terminate the reaction, whereby solution sample No. 1 of an aqueous polyurethane resin was yielded. (acid value of this polyurethane resin: 20.9, neutralization rate: 100%)

Example 2

Equipment of the same construction as used in Example 1 was charged with 300 parts of polybutylene glycol adipate diol having an average molecular weight of 1000 and 133.2 parts of isophorone diisocyanate, and reaction was performed at 100°–105° C. for 4 h while $N_2$ gas was introduced. Subsequently, 34.2 parts of dimethylolpropionic acid was fed and the reaction was continued at 80°–90° C. for 2 h.

After confirming the completion of reaction of dimethylolpropionic acid, 1134 parts of water and 26 parts of triethylamine were fed to make an aqueous system; further, 28 parts of the composition of compound A was fed to terminate the reaction, whereby solution sample No. 2 of an aqueous polyurethane resin was yielded. (acid value of this polyurethane resin: 29.8, neutralization rate: 100%)

Example 3

Equipment of the same construction as used in Example 1 was charged with 300 parts of polypropylene glycol having an average molecular weight of 1000 and 133.2 parts of isophorone diisocyanate, and reaction was performed at 100°–105° C. for 6 h while $N_2$ gas was introduced. Subsequently, 30.4 parts of N-methyldiethanolamine was fed and the reaction was continued at 80°–90° C. for 3 h. After confirming the completion of reaction of N-methyldiethanolamine, 1124 parts of water and 15 parts of acetic acid were fed to make an aqueous system; further, 28 parts of the composition of compound A was fed to terminate the reaction, whereby solution sample No. 3 of an aqueous polyurethane resin was yielded. (amine value of this polyurethane resin: 31.9, neutralization rate: 100%)

Example 4

Equipment of the same construction as used in Example 1 was charged with 300 parts of polybutylene glycol adipate diol having an average molecular weight of 1000 and 133.2.parts of isophorone diisocyanate, and reaction was performed at 100°–105° C. for 4 h while $N_2$ gas was introduced. Subsequently, 24.1 part of dimethylolpropionic acid was fed and the reaction was continued at 100°–110° C. for 2 h.

After confirming the completion of reaction of dimethylolpropionic acid, 943.7 parts of water and 16 parts of triethylamine were fed to make an aqueous system; further, 12 parts of hydrazinc hydrate was fed to terminate the reaction, whereby solution sample No. 4 of an aqueous polyurethane resin was yielded. (acid value of this polyurethane resin: 22.2, neutralization rate: 100%)

Example 5

Equipment of the same construction as used in Example 1 was charged with 300 parts of polybutylene glycol adipate diol having an average molecular weight of 1000 and 133.2 parts of isophorone diisocyanate, and reaction was performed at 100°–105° C. for 4 h while $N_2$ gas was introduced. Subsequently, 92.0 parts of the solution of compound B was fed and the reaction was continued at 100°–110° C. for 2 h.

After confirming the completion of reaction of compound B (aromatic carboxylic acid containing diol compound) in solution, 1121 parts of water and 16 parts of triethylamine were fed to make an aqueous system; further 14.2 parts of hydrated hydrazinc was fed to terminate the reaction, whereby solution sample No. 5 of an aqueous polyurethane resin was yielded. (acid value of this polyurethane resin: 18.3, neutralization rate: 100%)

Example 6

Equipment of the same construction as used in Example 1 was charged with 300 parts of polyester diol (monomer unit: neopenty adipate) having an average molecular weight of 1000 and 133.2 parts of isophorone diisocyanate, and reaction was performed at 100°–105° C. for 4 h while $N_2$ gas was introduced. Subsequently, 24.1 parts of dimethylolpropionic acid was fed and the reaction was continued at 100°–110° C. for 2 h.

After confirming the completion of reaction of dimethylolpropionic acid, the reaction mixture was cooled to 100° C.

and 1002 parts of water and 31.9 parts of triethylamine were fed to make an aqueous system; further 41.8 parts of adipic dihydrazide was fed to terminate the reaction, whereby solution sample No. 6 of an aqueous polyurethane resin was yielded. (acid value of this polyurethane resin: 20.7, neutralization rate: 100%)

Example 7

Equipment of the same construction as used in Example 1 was charged with 300 parts of polycarbonate diol having an average molecular weight of 1000 and 133.2 parts of isophorone diisocyante, and reaction was performed at 100°–105° C. for 4 h while $N_2$ gas was introduced. Subsequently, 24.1 parts of dimethylolpropionic acid was fed and the reaction was continued at 100°–110° C. for 2 h.

After confirming the completion of reaction of dimethylolpropionic acid, 943.7 parts of water and 16 parts of triethylamine were fed to make an aqueous system; further 12 parts of hydrated hydrazine was fed to terminate the reaction, whereby solution sample No. 7 of an aqueous polyurethane resin was yielded. (acid value of this polyurethane resin: 22.2, neutralization rate: 100%)

Example 8

Equipment of the same construction as used in Example 1 was charged with 300 parts of polypropylene glycol having an average molecular weight of 1000 and 133.2 parts of isophorone diisocyanate, and reaction was performed at 100°–105° C. for 6 h while $N_2$ gas was introduced. Subsequently, 24.1 parts of dimethylolpropionic acid was added and the reaction was continued at 80°–90° C. for 2 h. After confirming the completion of reaction of dimethylolpropionic acid, 1137 parts of water and 21.2 parts of triethylamine were fed to make an aqueous system; further, 22.3 parts of the composition of compound A was fed to perform chain extension, followed by feeding 3.7 parts of monoethanolamine to terminate the reaction, whereby solution sample No. 8 of an aqueous polyurethane resin was yielded. (acid value of this polyurethane resin: 21.3, neutralization rate: 100%)

Example 9

Equipment of the same construction as used in Example 1 was charged with 300 parts of polybutylene glycol adipate diol having an average molecular weight of 1000 and 133.2 parts of isophorone diisocyanate, and reaction was performed at 100°–105° C. for 4 h while $N_2$ gas was introduced. Subsequently, 148 parts of the solution of compound B was fed and the reaction was continued at 100°–110° C. for 2 h.

After confirming the completion of reaction of compound B (aromatic carboxylic acid containing diol compound) in solution, the reaction mixture was cooled to 100° C. and 1199 parts of water and 26 parts of triethylamine were added to make an aqueous system; further, 22.2 parts of the composition of compound A was fed to terminate the reaction, whereby solution sample No. 9 of an aqueous polyurethane resin was yielded. (acid value of this polyurethane: 27.1, neutralization rate: 100%)

Example 10

Equipment of the same construction as used in Example 1 was charged with 300 parts of polybutylene glycol adipate diol having an average molecular weight of 1000 and 32.7 parts of pyromellitic anhydride, and reaction was performed at 85°–90° C. for 2 h; thereafter, 53.3 parts of isophorone diisocyanate was added and the reaction was continued at 60°–70° C. for 4 h while $N_2$ gas was introduced.

Subsequently, 912 parts of water and 30.3 parts of triethylamine were added to make an aqueous system; further, 3.3 parts of ethylenediamine and 3.6 parts of hydrazine hydrate were fed to terminate the reaction, whereby solution sample No. 10 of an aqueous polyurethane resin was yielded (acid value of this polyurethane resin: 42.9, neutralization rate: 100%).

Example 11

Equipment of the same construction as used in Example 1 was charged with 500 parts of polypropylene glycol having an average molecular weight of 1000 and 222 parts of isophorone diisocyanate, and reaction was performed at 80°–90° C. for 4 h while $N_2$ gas was introduced.

Subsequently, 200 parts of acetone was added to make a solution, and a liquid mixture of isopropanol (100 parts) and ethylenediamine (18 parts) was added, followed by stirring at 30° C. for 10 min, addition of hydrazine hydrate (20 parts) and stirring at 30° C. for 1 h.

A stirred mixture of water (1360 parts) and polyoxyethylene nonyl phenol ether (150 parts: ethylene oxide added in 25 moles) was added to make an aqueous system; thereafter, acetone was distilled off to yield dispersion sample No. 1 of an aqueous polyurethane resin.

Comparative Example 1

Equipment of the same construction as used in Example 1 was charged with 300 parts of polypropylene glycol having an average molecular weight of 1000 and 133.2 parts of isophorone diisocyanate, and reaction was performed at 100°–105° C. for 4 h; subsequently, 24.1 parts of dimethylolpropionic acid was fed and the reaction was continued at 100°–110° C. for 2 h.

After confirming the completion of reaction of dimethylolpropionic acid, 1130 parts of water and 16 parts of triethylamine were fed to make an aqueous system; further, 14.7 parts of monoethanolamine was fed to terminate the reaction, whereby solution sample No. 11 of an aqueous polyurethane resin was yielded. (acid value of this polyurethane resin: 21.9, neutralization rate: 100%)

Comparative Example 2

Equipment of the same construction as used in Example 1 was charged with 800 parts of polybutylene glycol adipate diol having an average molecular weight of 1000 and 138.2 parts of isophorone diisocyanate, and reaction was performed at 100°–105° C. for 4 h; subsequently, 24.1 parts of dimethylolpropionic acid was fed and the reaction was continued at 100°–110° C. for 2 h.

After confirming the completion of reaction of dimethylolpropionic acid, 1130 parts of water and 16 parts of triethylamine were fed to make an aqueous system; further, 14.7 parts of monoethanolamine was fed to terminate the reaction, whereby solution sample No. 12 of an aqueous polyurethane resin was yielded. (acid value of this polyurethane resin: 21.9, neutralization rate: 100%)

Comparative Example 3

Equipment of the same construction as used in Synthesis Example 1 was charged with 300 parts of polycarbonate diol having an average molecular weight of 1000 and 133.2 parts of isophorone diisocyanate, and reaction was performed at 100°–105° C. for 4 h while $N_2$ gas was introduced. Subsequently, 52.3 parts of dimethylolpropionic acid was fed and the reaction was continued at 100°–110° C. for 2h.

After confirming the completion of reaction of dimethylolpropionic acid, 1180 parts of water and 16 parts of triethylamine were fed to make an aqueous system; further, 14.7 parts of monoethanolamine was fed to terminate the reaction, whereby solution sample No. 13 of an aqueous polyurethane resin was yielded. (acid value of this polyurethane resin: 21.9, neutralization rate: 100%)

Production of Aqueous Printing Ink Compositions and Aqueous Laminating Adhesives In accordance with the formulae listed in Table 1, solution sample Nos. 1–7 and 11–13 of aqueous polyurethane resin as prepared in Examples 1–7 and Comparative Examples 1–3, respectively, were mixed with a pigment under agitation for 30 min in a Red Devil type disperser; other predetermined materials were added to prepare laminating aqueous printing ink samples identified as Nos. 1–7, 9–12 and five comparative samples (Comp. Nos. 1–5). Laminating aqueous printing ink sample No. 8 was prepared as follows: 14 parts of a pigment, 1 part of a pigment dispersant BYK-181 (BYK Corp.) and 50 parts of dispersion sample No. 1 of aqueous polyurethane resin were stirred in a Red Devil type disperser and 35 parts of water was further added.

The pigment used was Fastgen Blue 5212SD (Dainippon Ink & Chemicals, Inc.), and the epoxy resin was diglycerin diglycidyl ether (Nagase Kasei Co., Ltd.; epoxy equivalent, 155).

In a separate run, solution sample Nos. 2 and 8–13 of aqueous polyurethane resin as prepared in Examples 2 and 8–10 and Comparative Examples 1–3 were mixed with epoxy resin A or B under agitation in accordance with the formulae shown in Table 4, whereby aqueous laminating adhesive samples identified under Nos. 1–8 and comparative samples identified under Comp. Nos. 1–5 were prepared.

Epoxy resin A was bisphenol A diglycidyl ether (Yuka Shell Epoxy Co. Ltd.; epoxy equivalent, 190), and epoxy resin B was triglycidyl trimethylolpropane (Sakamoto Yakuhin Industry Co., Ltd.; epoxy equivalent, 101).

Evaluation of Aqueous Printing Ink Sample Nos. 1–12 and Comp. Nos. 1–5 and Aqueous Laminating Adhesive Sample Nos. 1–8 and Comp. Nos. 1–5

Aqueous printing ink sample Nos. 1–12 and Comp. Nos. 1–5 were evaluated for adhesive strength, the peel strength of extrusion laminate, the peel strength of adhesive laminate, as well as adaptabilities for boiling and retorting, and the results are shown in Tables 2 and 3.

Aqueous laminating adhesive sample Nos. 1–8 and Comp. Nos. 1–5 were evaluated for the peel strength of extrusion laminate, the peel strength of adhesive laminate, as well as adaptabilities for boiling and retorting. The results are shown in Table. 5.

The methods of evaluation and the criteria for evaluation were as follows, in which "OPP" means oriented polypropylene (Toyobo Co., Ltd.; P-2161, 30 μm), "PET" polyethylene terephthalate (Toyobo Co., Ltd.; E-5102, 12 μm), "NY" nylon (Unitika Ltd.; Emblem, 15 μm), and "CPP" casted polypropylene (Toray Industries, Ltd.; 60 μm).

The primer coat used in testing the peel strength of extrusion laminate on aqueous printing ink sample Nos. 1–12 and Comp. Nos. 1–5 were an imine-based primer coat (Toyo Morton Co., Ltd.; EL-420) and an isocyanate base primer coat (Toyo Morton; EL-433A/C). The adhesives used in testing the peel strength of adhesive laminates on the same samples were aqueous laminating adhesive sample No. 7 and an organic solvent-base isocyanate base adhesive (Takeda Chemical Industries, Ltd.; Takenate A-385/Takerak A-50).

The same films were used in the evaluations of both aqueous printing inks and water-based laminating adhesives.

Adhesive Strength

Test method: Aqueous printing ink sample Nos. 1–12 and Comp. Nos. 1–5 were printed on corona-discharged OPP films in a proof press; adhesive tape was applied over the printed surface and quickly pulled off; the adhesive strength of ink was evaluated in terms of the amount of peel of the printed layer from the OPP film.

Criteria: A, No part of the printed layer was pulled off the film; B, Less than 20% in area of the printed layer was pulled off the film; C, At least 20% in area of the printed layer pulled off the film; D, From 20% to less than 50% in area of the printed layer was pulled off the film; D, At least 50% in area of the printed layer was pulled off the film.

Peel strength of extrusion laminate

Test method: Aqueous printing ink sample Nos. 1–12 and Comp. Nos. 1–5 were printed on OPP films in a proof press and, thereafter, an imine base primer coat was applied and overlaid with molten polyethylene on an extrusion laminating machine, thereby preparing laminates. In a separate run, aqueous printing ink sample Nos. 1, 2, 4–7 and 9–12, as well as Comp. Nos. 2–5 were printed on PET or NY films in a proof press and, thereafter, an isocyanate base primer coat was applied and overlaid with molten polyethylene on an extrusion laminating machine, thereby preparing laminates. In still another run, aqueous printing ink sample No. 10 was printed on OPP, PET or NY films; thereafter, aqueous laminating adhesive sample Nos. 1–8 were applied and overlaid with molten polyethylene on an extrusion laminating machine, thereby preparing laminates.

These laminates were left to stand at 40° C. for 3 days, cut to 15-mm widths and measured for T-type peel strength on a peel tester of Yasuda Seiki K. K.

Method of evaluation: Measured values of peel strength (g/15 mm) were noted.

Peel strength of adhesive laminate

Test method: In the test on aqueous printing inks, aqueous laminating adhesive sample No. 7 and an organic solvent-based isocyanate base adhesive were applied to the same printed matter as used in the test for the peel strength of extrusion laminates, and the adhesive layers were overlaid with CPP film on an adhesive laminating machine, thereby preparing laminates. In the test on aqueous laminating adhesives, aqueous laminating adhesive sample Nos. 1–8 and Comp. Nos. 1–5 were applied to the sample printed matter as used in the test for the peel strength of extrusion laminates, and the adhesive layers were overlaid with CPP film on an adhesive laminating machine, thereby preparing laminates.

These laminates were left to stand at 40° C. for 3 days, cut to 15-mm width and measured for T-type peel strength on a peel tester of Yasuda Seiki K. K.

Method of evaluation: In the test on aqueous printing inks, the measured values of peel strength (g/15 mm) on the laminates coated with aqueous laminating adhesive sample No. 7 were noted as "peel strength of adhesive laminate (1)", and the measured values of peel strength (g/15 mm) on the laminates coated with the organic solvent-base isocyanate base adhesive were noted as "peel strength of adhesive laminate (2)" In the test on aqueous laminating adhesives, the measured values of peel strength (g/15 mm) were noted.

Adaptabilities for boiling and retorting

Test method: In the test on aqueous printing inks, the adhesive laminates made from the PET films printed with aqueous printing ink sample Nos. 9–12 and Comp. Nos. 4 and 5 were formed into bags; in the test on aqueous laminating adhesives, the adhesive laminates made from the PET films printed with aqueous laminating adhesive sample Nos. 5–8, as well as the adhesive laminates made from the PET films printed with aqueous laminating adhesive sample Nos. 5–8 and Comp. Nos. 4 and 5 were formed into bags; the bags thus formed were filled with a mixture of water and oil, sealed and heated in hot water at 90° C. for 30 min to evaluate the adaptability for boiling; or the bags were heated in pressurized hot water at 120° C. for 30 min to evaluate the adaptability for retorting. The results were rated in view of the appearance of laminates (i.e., the presence or absence of delamination).

Criteria: In the test on aqueous printing inks, the adaptabilities for boiling and retorting of the laminates coated with aqueous laminating adhesive sample No. 7 were noted as "Adaptability for boiling (1)" and "Adaptability for retorting (1)", respectively, whereas the adaptabilities for boiling and retorting of the laminates coated with the organic solvent-base isocyanate-base adhesive were noted as "Adaptability for boiling (2)" and "Adaptability for retorting (2)", respectively. In the test on aqueous laminating adhesives, the adaptability for boiling of the extrusion laminates, as well as the adaptabilities for boiling and retorting of the dry laminates were evaluated in view of appearance by the following criteria: A, No delaminating occurred; B, Delamination occurred as pinholes; C, Delamination occurred all over the surface.

TABLE 1

Formulae of Aqueous Printing Inks

| | | Ink No. | | | | | | | | | | | | | | |
|---|---|---|---|---|---|---|---|---|---|---|---|---|---|---|---|---|
| | | 1 | 2 | 3 | 4 | 5 | 6 | 7 | 9 | 10 | 11 | 12 | Comp. 1 | Comp. 2 | Comp. 3 | Comp. 4 | Comp. 5 |
| | | Aqueous polyurethane resin No. | | | | | | | | | | | | | | |
| | | 1 | 2 | 3 | 4 | 5 | 6 | 7 | 1 | 2 | 5 | 7 | 11 | 12 | 13 | 12 | 13 |
| Ink formula (wt %) | Aqueous polyurethane resin solution | 50 | 50 | 50 | 50 | 50 | 50 | 50 | 50 | 50 | 50 | 50 | 50 | 50 | 50 | 50 | 50 |
| | Pigment | 14 | 14 | 14 | 14 | 14 | 14 | 14 | 14 | 14 | 14 | 14 | 14 | 14 | 14 | 14 | 14 |
| | Isopropanol | 2 | 2 | 2 | 2 | 2 | 2 | 2 | 2 | 2 | 2 | 2 | 2 | 2 | 2 | 2 | 2 |
| | Epoxy resin | — | — | — | — | — | — | — | 2 | 2 | 2 | 2 | — | — | — | 2 | 2 |
| | Water | 34 | 34 | 34 | 34 | 34 | 34 | 34 | 32 | 32 | 32 | 32 | 34 | 34 | 34 | 32 | 32 |

TABLE 2

Results of Evaluation of Aqueous Printing Inks and Laminates

| | | Ink No. | | | | | | | | | |
|---|---|---|---|---|---|---|---|---|---|---|---|
| | | 1 | 2 | 3 | 4 | 5 | 6 | 7 | Comp. 1 | Comp. 2 | Comp. 3 |
| | | Adhesive Strength | | | | | | | | | |
| | | A | A | A | A | A | A | A | D | D | B |
| Peel strength of extrusion laminate | OPP | 210 | 220 | 150 | 190 | 200 | 100 | 210 | 5 | 15 | 30 |
| | PET | 500 | 500 | — | 500 | 500 | 500 | 500 | — | 150 | 290 |
| | NY | 500 | 500 | — | 500 | 500 | 500 | 500 | — | 190 | 300 |
| Peel strength of adhesive laminate (1) | OPP | 190 | 200 | 220 | 190 | 200 | 200 | 210 | 20 | 50 | 150 |
| | PET | 500 | 250 | — | 310 | 500 | 300 | 370 | — | 250 | 250 |
| | NY | 500 | 300 | — | 360 | 500 | 420 | 500 | — | 260 | 310 |
| Peel strength of adhesive laminate (2) | OPP | 190 | 200 | 200 | 220 | 210 | 200 | 180 | 20 | 50 | 100 |
| | PET | 500 | 300 | — | 270 | 500 | 330 | 500 | — | 240 | 300 |
| | NY | 500 | 440 | — | 400 | 500 | 360 | 500 | — | 300 | 300 |

TABLE 3

Results of Evaluation of Aqueous Printing Inks and Laminates

| | | Ink No. | | | | | |
|---|---|---|---|---|---|---|---|
| | | 9 | 10 | 11 | 12 | Comp. 4 | Comp. 5 |
| | | Adhesive strength | | | | | |
| | | A | A | A | A | D | B |
| Peel strength of extrusion laminate | OPP | 210 | 240 | 200 | 220 | 15 | 30 |
| | PET | 500 | 500 | 500 | 500 | 150 | 210 |
| | NY | 500 | 500 | 500 | 500 | 260 | 300 |
| Peel strength of adhesive laminate (1) | OPP | 190 | 190 | 210 | 220 | 50 | 140 |
| | PET | 500 | 320 | 430 | 500 | 250 | 290 |
| | NY | 500 | 500 | 500 | 500 | 80 | 330 |
| Peel strength of adhesive laminate (2) | OPP | 200 | 210 | 220 | 220 | 50 | 160 |
| | PET | 500 | 310 | 500 | 500 | 300 | 300 |
| | NY | 500 | 500 | 500 | 500 | 310 | 340 |
| Adaptability | PET | A | A | A | A | C | B |

TABLE 3-continued

Results of Evaluation of Aqueous Printing Inks and Laminates

|  |  | Ink No. | | | | | |
|---|---|---|---|---|---|---|---|
|  |  | 9 | 10 | 11 | 12 | Comp. 4 | Comp. 5 |
|  |  | | | | Adhesive strength | | |
|  |  | A | A | A | A | D | B |
| for boiling (1) | | | | | | | |
| Adaptability for boiling (2) | PET | A | A | A | A | C | B |
| Adaptability for retorting (1) | PET | A | A | A | A | C | B |
| Adaptability for retorting (2) | PET | A | A | A | A | C | B | combined use of that ink composition with the aqueous laminating adhesive are totally aqueous and exhibit high strength; at the same time, they have good adaptabilities for boiling and retorting.

What is claimed is:

1. In a polyurethane resin having a number average molecular weight of 2,000–200,000 and molecular structure represented by the following general formula (1):

$$T_1-(UP_1-E_1)-\ldots-(UP_{n+1}-E_{n+1})-UP_{n+2}-T_2 \quad (1)$$

wherein $UP_1$, $UP_2$ ... $Up_{n+2}$ is that part of a urethane prepolymer which excludes a terminated isocyanate group, said prepolymer being prepared by reacting an organic diisocyanate compound with a polymer diol compound, provided that n is an integer of 0–18 and that $UP_1$, $UP_2$ ... $UP_{n+2}$ have the same or different structures;

$E_1$, $E_2$ ... $E_{n+1}$ is that part of a chain extender which excludes the functional groups reacted with the isocy-

TABLE 4

Formulae of Aqueous Laminating Adhesives

| | | Adhesive No. | | | | | | | | | | | | |
|---|---|---|---|---|---|---|---|---|---|---|---|---|---|---|
| | | 1 | 2 | 3 | 4 | 5 | 6 | 7 | 8 | Comp. 1 | Comp. 2 | Comp. 3 | Comp. 4 | Comp. 5 |
| | | Aqueous polyurethane resin solution No. | | | | | | | | | | | | |
| | | 2 | 8 | 9 | 10 | 2 | 2 | 2 | 2 | 11 | 12 | 13 | 12 | 13 |
| Adhesive formula (wt %) | Content of aqueous polyurethane resin solution | 100 | 100 | 100 | 100 | 93 | 93 | 89 | 77 | 100 | 100 | 100 | 89 | 89 |
| | Content of epoxy resin A | — | — | — | — | 7 | — | — | — | — | — | — | — | — |
| | Content of epoxy resin B | — | — | — | — | — | 7 | 11 | 23 | — | — | — | 11 | 11 |
| Polyurethane resin/epoxy resin weight ratio as ratio as solids content | | 80/20 | 80/20 | 70/30 | 70/30 | 80/20 | 80/20 | 70/30 | 50/50 | 100/0 | 100/0 | 100/0 | 70/30 | 70/30 |

TABLE 5

Results of Evaluation of Aqueous Laminating Adhesives

| | | | Adhesive No. | | | | | | | | | | | | |
|---|---|---|---|---|---|---|---|---|---|---|---|---|---|---|---|
| | | | 1 | 2 | 3 | 4 | 5 | 6 | 7 | 8 | Comp. 1 | Comp. 2 | Comp. 3 | Comp. 4 | Comp. 5 |
| Extrusion laminate | Peel strength of laminate | OPP | 190 | 200 | 210 | 190 | 220 | 230 | 200 | 200 | — | — | — | — | — |
| | | PET | 450 | 500 | 480 | 490 | 500 | 500 | 520 | 480 | — | — | — | — | — |
| | | NY | 500 | 500 | 500 | 500 | 500 | 500 | 500 | 500 | — | — | — | — | — |
| | Adaptability for boiling | | — | — | — | — | B | B | A | A | — | — | — | — | — |
| Adhesive laminate | Peel strength of laminate | OPP | 150 | 210 | 240 | 220 | 200 | 170 | 190 | 210 | 30 | 50 | 50 | 50 | 70 |
| | | PET | 460 | 500 | 500 | 460 | 500 | 480 | 320 | 500 | 50 | 100 | 140 | 90 | 100 |
| | | NY | 500 | 500 | 500 | 500 | 500 | 460 | 500 | 500 | 150 | 90 | 100 | 100 | 100 |
| | Adaptability for boiling | | — | — | — | — | A | A | A | A | — | — | — | C | C |
| | Adaptability for retorting | | — | — | — | — | B | B | A | A | — | — | — | C | C |

As described above specifically with reference to working examples, the aqueous polyurethane resin specified by the present invention can be used as binder resins in aqueous printing ink compositions or as aqueous laminating adhesives. The aqueous printing ink compositions that use this aqueous polyurethane resin exhibit satisfactory adhesion to various kinds of plastic films. The laminates produced by the anate group, said chain extender having at least two functional groups capable of reacting with the isocyanate group, provided that n is an integer of 0–18 and that $E_1$, $E_2$ ... $E_{n+1}$ have the same or different structures;

$T_1$ and $T_2$ is that part of a terminator which excludes the functional groups reacted with the isoyanate group, said terminator having at least one functional group capable of reacting with the isocyanate group, provided that $T_1$ and $T_2$ have the same or different structure; and — is the bond that has been formed by reaction between the isocyanate group and the functional group capable of reacting with said isocyanate group;

wherein said polyurethane resin represented by general formula (1) is prepared by reacting an organic diisocyanate compound, a polymer diol compound, at least one chain extender and a terminator, the improvement wherein said at least one chain extender is a polyaminohydrazide represented by the following general formula (2):

$$H_2N-R_1-NH-CH_2-CH(R_2)-C(=O)-NH-NH_2 \quad (2)$$

wherein $R_1$ is an alkylene group having 2–15 carbon atoms, that portion of an alicyclic or aromatic diamine having 6–15 carbon atoms which excludes the amino group, or that portion of a polyethylene polyamine having 3–5 nitrogen atoms which excludes a primary amino group; and $R_2$ is hydrogen or a methyl group;

such that at least one hydrazide group is incorporated into said polyurethane resin.

2. In a polyurethane resin having a number average molecular weight of 2,000–200,000 and molecular structure represented by the following general formula (1):

$$T_1-(UP_1-E_1)-\ldots-(UP_{n+1}-E_{n+1})-UP_{n+2}-T_2 \quad (1)$$

wherein $UP_1, UP_2 \ldots UP_{n+2}$ is that part of a urethane prepolymer which excludes a terminated isoyanate group, said prepolymer being prepared by reacting an organic diisocyanate compound with a polymer diol compound, provided that n is an integer of 0–18 and that $UP_1$, $UP_2$ ... $UP_{n+2}$ have the same or different structures;

$E_1, E_2 \ldots E_{n+1}$ is that part of a chain extender which excludes the functional groups reacted with the isocyanate group, said chain extender having at least two functional groups capable of reacting with the isocyanate group, provided that n is an integer of 0–18 and that $E_1, E_2 \ldots E_{n+1}$ have the same or different structures;

$T_1$ and $T_2$ is a residue of a compound selected from the group consisting of hydrazines, alkylenedihydrazines, alkylenedihydrazides and polyaminohydrazines; and — is the bond that has been formed by reaction between the isocyanate group and the functional group capable of reacting with said isocyanate group;

wherein said polyurethane resin represented by general formula (1) is prepared by reacting an organic diisocyanate compound, a polymer diol compound, a chain extender, and at least one terminator, the improvement wherein said at least one terminator is at least one compound selected from the group consisting of hydrazines, alkylenedihydrazines, alkylenedihydrazides and polyaminohydrazides represented by the following general formula (2):

$$H_2N-R_1-NH-CH_2-CH(R_2)-C(=O)-NH-NH_2 \quad (2)$$

wherein $R_1$ is an alkylene group having 2–15 carbon atoms, that portion of an alicyclic or aromatic diamine having 6–15 carbon atoms which excludes the amino group, or that portion of a polyethylene polyamine having 3–5 nitrogen atoms which excludes a primary amino group; and $R_2$ is hydrogen or a methyl group;

such that at least one member selected from the group consisting of a hydrazine group, a hydrazide group, and a semicarbazide group is incorporated into said polyurethane resin.

3. An aqueous polyurethane resin prepared by dispersing the polyurethane resin of claims 1 or 2 in water in an amount of 5–50 wt % as a solids content in the presence of an emulsifier.

4. An aqueous polyurethane resin prepared by dissolving or dispersing the polyurethane resin of claim 1 or 2 in an aqueous alkali solution in an amount of 5–50 wt % as a solids content, said polyurethane resin having an acid value of 5–100 and wherein compound the polymer diol has at least one free carboxyl group and/or the chain extender has at least one free carboxyl group, the amount of alkali in said aqueous solution being 0.15–1.2 times the equivalent amount necessary to achieve neutralization.

5. An aqueous polyurethane resin prepared by dissolving or dispersing the polyurethane resin of claim 1 or 2 in an aqueous alkali solution in an amount of 5–50 wt % as a solids content, said polyurethane resin having an acid value of 5–100 and wherein compound the polymer diol has at least one free carboxyl group directly bonded to the aromatic ring and/or the chain extender has at least one free carboxyl group directly bonded to the aromatic ring, the amount of alkali in said aqueous solution being 0.15–1.2 times the equivalent amount necessary to achieve neutralization.

6. An aqueous polyurethane resin according to claim 4, in which dimethylolpropionic acid is the chain extender and in which triethylamine is the alkali.

7. An aqueous polyurethane resin prepared by dissolving or dispersing the polyurethane resin of claim 1 or 2 in an aqueous acid solution in an amount of 5–50 wt % as a solids content, said polyurethane resin having an amino value of 10–40 and wherein a the polymer diol compound has a tertiary amino group and/or the chain extender has a tertiary amino group, the amount of acid in said aqueous solution being 0.15–1.2 times the equivalent amount necessary to achieve neutralization.

8. An aqueous polyurethane resin according to claim 7 wherein N-methyldiethanolamine is the chain extender and in which acetic acid is the acid.

9. An aqueous printing ink composition for use on plastic films that comprises a pigment, water and a binder resin, said binder resin being the polyurethane resin of claim 1 or 2.

10. An aqueous printing ink composition for use on plastic films according to claim 9 which further contains a water-soluble or a water-reducible epoxy resin, the weight ratio of the solids content of said aqueous polyurethane resin to that of the epoxy resin being in the range from 99:1 to 50:50.

11. An aqueous laminating adhesive containing the polyurethane resin of claim 1 or 2.

12. An aqueous laminating adhesive according to claim 11 which further contains a water-soluble or a water-reducible epoxy resin, the weight ratio of the solids content of said aqueous polyurethane resin to that of the epoxy resin being from 99:1 to 50:50.

13. A process for producing a laminate that comprises printing the aqueous printing ink of claim 9 on a plastic film, then applying an adhesive and optionally a primer coat to the printed surface, and thereafter laminating a molten polymer or a polymer film thereon.

14. A process for producing a laminate that comprises printing the aqueous printing ink of claim 10 on a plastic film, then applying an adhesive and optionally a primer coat to the printed surface, and thereafter laminating a molten polymer or a polymer film thereon.

15. A process for producing a laminate that comprises printing the aqueous printing ink of claim 9 on a plastic film, then applying the water-based laminating adhesive containing the water-based polyurethane resin having a number average molecular weight of 2,000–200,000 prepared by reacting an organic diisocyanate compound, a polymer diol compound, a chain extender and a terminator, wherein the chain extender and/or the terminator has at least one hydrazine group or hydrazide group to incorporate at least one group selected from the group consisting of a hydrazine group, a hydrazide group, and a semicarbazide group into the molecule of the polyurethane resin, to the printed surface, and thereafter laminating a molten polymer or a polymer film.

16. A process for producing a laminate that comprises printing the aqueous printing ink of claim 9 on a plastic film, then applying the water-based laminating adhesive containing the water-based polyurethane resin having a number average molecular weight of 2,000–200,000. prepared by reacting an organic diisocyanate compound, a polymer diol compound, a chain extender and a terminator, wherein the chain extender and/or the terminator has at least one hydrazine group or hydrazide group to incorporate at least one group selected from the group consisting of a hydrazine group, a hydrazide group, and a semicarbazide group into the molecule of the polyurethane resin and further containing a water-soluble or a water-reducible epoxy resin, the weight ratio of the solids content of said aqueous polyurethane resin to that of the epoxy resin being from 99:1 to 50:50, to the printed surface, and thereafter laminating a molten polymer or a polymer film.

17. A process for producing a polyurethane resin represented by the following formula (1):

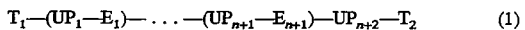

wherein $UP_1$, $UP_2$ ... $Up_{n+2}$ is that part of a urethane prepolymer which excludes a terminated isocyanate group, said prepolymer being prepared by reacting an organic diisocyanate compound with a polymer diol compound, provided that n is an integer of 0–18 and that $UP_1$, $UP_2$ ... $Up_{n+2}$ have the same or different structures;

$E_1$, $E_2$ ... $E_{n+1}$ is that part of a chain extender which excludes the functional groups reacted with the isocyanate group, said chain extender having at least two functional groups capable of reacting with the isocyanate group, provided that n is an integer of 0–18 and that $E_1$, $E_2$ ... $E_{n+1}$ have the same or different structures;

$T_1$ and $T_2$ is that part of a terminator which excludes the functional groups reacted with the isocyanate group, said terminator having at least one functional group capable of reacting with the isocyanate group, provided that $T_1$ and $T_2$ have the same or different structure; and — is the bond that has been formed by reaction between the isocyanate group and the functional group capable of reacting with said isocyanate group;

said process comprising the steps of:

reacting an organic diisocyanate compound with a polymer diol compound at a molar ratio of diisocyanate/polymer diol of 1.3/1.0 to 3.0/1.0 to synthesize a urethane prepolymer, then chain extending the polymer using at least one chain extender in an amount 0.5–0.95 times the equivalent amount of residual isocyanate groups, wherein said at least one chain extender is polyaminohydrazide represented by the following general formula (2):

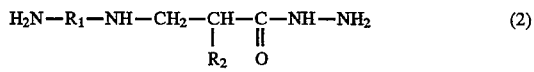

wherein $R_1$ is an alkylene group having 2–15 carbon atoms, that portion of an alicyclic or aromatic diamine having 6–15 carbon atoms which excludes the amino group, or that portion of a polyethylene polyamine having 3–5 nitrogen atoms which excludes a primary amino group; and $R_2$ is hydrogen or a methyl group;

so that at least one hydrazide group is incorporated into said polyurethane resin, and terminating the reaction of any residual isocyanate groups with a terminator, wherein the chain extender has at least one hydrazide group so as to incorporate at least one hydrazide group into said polyurethane resin.

18. A process for producing a polyurethane resin represented by the following formula (1):

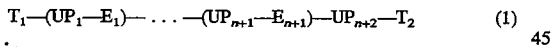

wherein $UP_1$, $UP_2$ ... $Up_{n+2}$ is that part of a urethane prepolymer which excludes a terminated isocyanate group, said prepolymer being prepared by reacting an organic diisocyanate compound with a polymer diol compound, provided that n is an integer of 0–18 and that $UP_1$, $UP_2$ ... $Up_{n+2}$ have the same or different structures;

$E_1$, $E_2$ ... $E_{n+1}$ is that part of a chain extender which excludes the functional groups reacted with the isocyanate group, said chain extender having at least two functional groups capable of reacting with the isocyanate group, provided that n is an integer of 0–18 and that $E_1$, $E_2$ ... $E_{n+1}$ have the same or different structures;

$T_1$ and $T_2$ is a residue of a compound selected from the group consisting of hydrazines, alkylenedihydrazines, alkylenedihydrazides and polyaminohydrazides; and — is the bond that has been formed by reaction between the isocyanate group and the functional group capable of reacting with said isocyanate group;

said process comprising the steps of:

reacting an organic diisocyanate compound with a polymer diol compound at a molar ratio of diisocyanate/polymer diol of 1.3/1.0 to 3.0/1.0 to synthesize a urethane prepolymer, then chain extending the polymer using a chain extender in an amount 0.5–0.95 times the equivalent amount of residual isoycyanate groups, and terminating the reaction of any residual isocyanate groups with at least one terminator, wherein said at least one terminator is at least one compound selected from the group consisting of hydrazines, alkylene dihydrazines, alkylenedihydrazides and polyaminohydrazide, and is represented by the following general formula (2):

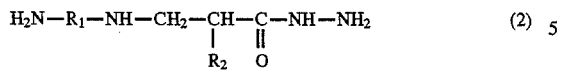 (2)

wherein $R_1$ is an alkylene group having 2–15 carbon atoms, that portion of an alicyclic or aromatic diamine having 6–15 carbon atoms which excludes the amino group, or that portion of a polyethylene polyamine having 3–5 nitrogen atoms which excludes a primary amino group; and $R_2$ is hydrogen or a methyl group;

so that at least one member selected from group consisting of a hydrazine group, a hydrazide group, and a semicarbazide group is incorporated into said polyurethane resin, wherein the terminator has at least one hydrazine group or hydrazide group so as to incorporate at least one hydrazine group, hydrazide group or semicarbazide group into said polyurethane resin.

19. A process according to claim 17 or 18 wherein the molar ratio of diisocyanate/polymer diol is 1.3/1.0–2.0/1.0.

* * * * *